United States Patent
Govindassamy et al.

(10) Patent No.: US 9,930,590 B1
(45) Date of Patent: Mar. 27, 2018

(54) METHOD AND APPARATUS FOR IMPROVED USER EXPERIENCE IN A CLIENT TERMINAL

(71) Applicant: MBIT WIRELESS, INC., Newport Beach, CA (US)

(72) Inventors: Sivakumar Govindassamy, Irvine, CA (US); Arumugam Govindswamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 123 days.

(21) Appl. No.: 15/006,318

(22) Filed: Jan. 26, 2016

(51) Int. Cl.
*H04W 36/08* (2009.01)
*H04W 72/04* (2009.01)
*H04L 29/06* (2006.01)
*H04W 52/02* (2009.01)
*H04W 48/10* (2009.01)

(52) U.S. Cl.
CPC ......... *H04W 36/08* (2013.01); *H04L 65/4076* (2013.01); *H04W 48/10* (2013.01); *H04W 52/0232* (2013.01); *H04W 72/048* (2013.01)

(58) Field of Classification Search
CPC . H04W 36/08; H04W 48/10; H04W 52/0232; H04W 72/048; H04L 65/4076
See application file for complete search history.

(56) References Cited

U.S. PATENT DOCUMENTS

2014/0057628 A1*  2/2014  Wong .................... H04W 24/02
                                                    455/424

* cited by examiner

*Primary Examiner* — Peter Chau
(74) *Attorney, Agent, or Firm* — Lerner, David, Littenberg, Krumholz & Mentlik, LLP

(57) ABSTRACT

In a wireless communication system, a client terminal may be required to periodically receive the broadcast and multicast system information of the serving and neighbor base stations. In most scenarios the broadcast and multicast system information of base stations may not change frequently. A method and apparatus are disclosed to store, manage and use the broadcast and multicast system information of a set of latest serving and neighbor base stations. This may enable a client terminal to avoid receiving and processing all or most of the base station system information messages. This may significantly reduce the active states of a client terminal and may lead to significant reduction in power consumption, which may be a critical advantage for battery operated client terminals. The present invention may also reduce the time taken by a client terminal to get connected or reconnected to a base station, which may improve the user experience.

25 Claims, 14 Drawing Sheets

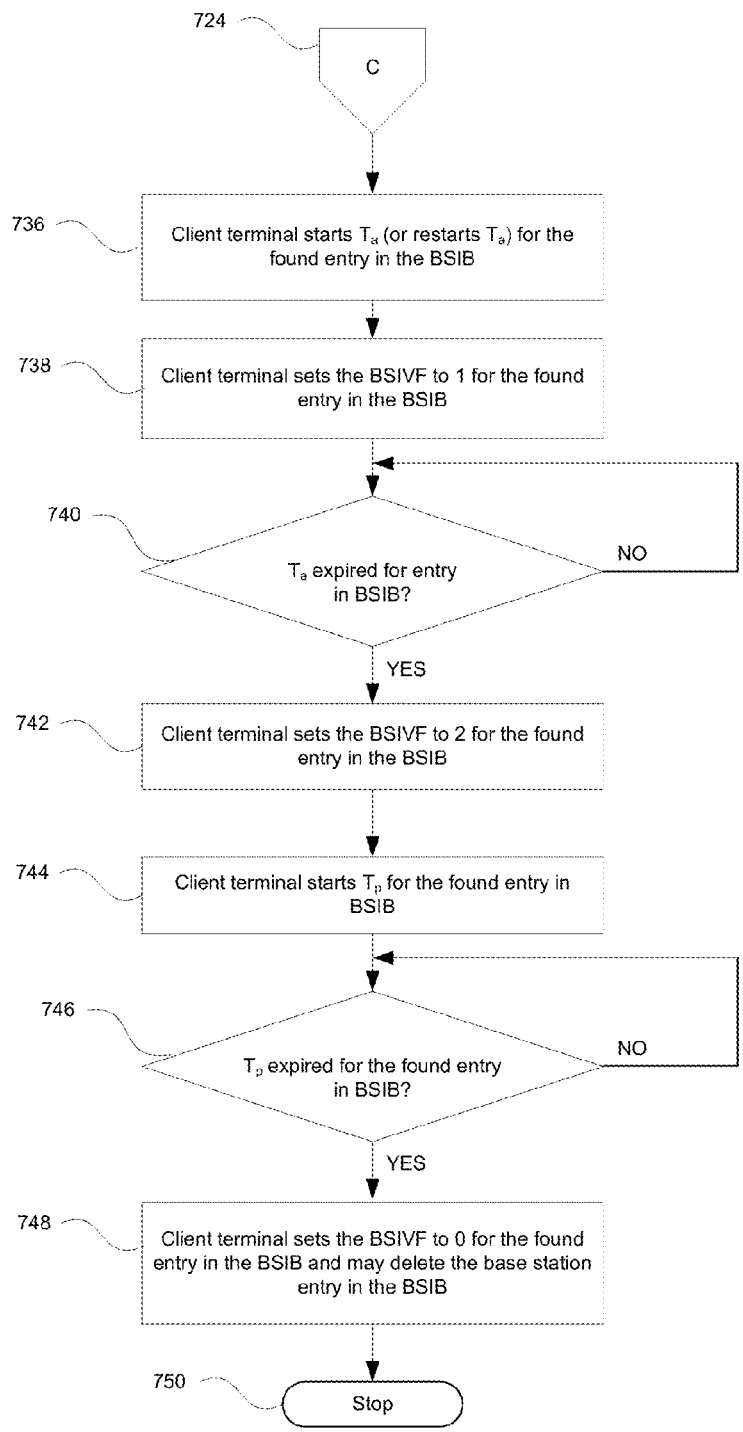

METHOD AND APPARATUS FOR IMPROVED USER EXPERIENCE IN A CLIENT TERMINAL

BACKGROUND

Typically, as shown in FIG. 1, a wireless communication system comprises elements such as client terminals or mobile stations and one or more base stations. Other network devices may also be employed, such as a mobile switching center (not shown). As illustrated in FIG. 1, the communication path from the base station ("BS") to the client terminal or mobile station ("MS") is referred to herein as a downlink ("DL") direction or downlink channel, and the communication path from the client terminal to the base station is referred to herein as an uplink ("UL") direction or uplink channel. In some wireless communication systems, the MS communicates with the BS in both the DL and UL directions. For instance, such communication is carried out in cellular telephone systems. In other wireless communication systems, the client terminal communicates with the base stations in only one direction, usually the DL. Such DL communication may occur in applications such as paging. As used herein, the terms "base station" and "network" are used interchangeably.

Normally, the transmission intervals in downlink channel or in an uplink channel spans certain predefined duration and it is referred to as "frame" herein. A frame duration may be different for different communication systems and normally it is on the order of a few milliseconds. For example, the frame duration may be 5 milliseconds. Typically in a wireless communication system, the client terminal and the base station may transmit information in blocks of data and such a block of data is referred herein as a "message."

Normally, certain types of system information may be required by all client terminals so that they may communicate with the wireless communication network. The system information typically includes synchronization information, system parameters, allocation information, paging information, etc. The wireless communication network may transmit such system information as broadcast data so that all client terminals within its coverage area may be able to receive and such information is herein referred to as "broadcast messages." Typically in a wireless communication system sometimes a base station may transmit some information that may be addressed only to a group of client terminals and such messages are herein referred to as "multicast messages." Examples of multicast messages include multimedia information about sports, news, traffic, weather, etc. Typically in a wireless communication system the base station may transmit messages that are uniquely addressed to a particular client terminal and such messages are herein referred as "unicast messages." An example of a unicast message is user specific payload data.

Typically, in wireless communication systems many client terminals are handheld portable battery operated devices. Hence it is important for the client terminals to operate in a power efficient manner. To reduce power consumption, the client terminal may turn off most of its hardware and software components when it is not required to receive in downlink direction or transmit in uplink direction. From a Power Management (PM) perspective, the state of the client terminal in which it may turn off most of its hardware and software components is referred herein as "PM sleep state." The state in which the client terminal is involved in downlink data transfer or uplink data transfer or in transfer in both directions is referred herein as "PM active state."

The transition from PM sleep state to PM active state of the client terminal is referred herein as "wake-up" state. The transition from PM active state to PM sleep state of the client terminal is referred to herein as "entering-sleep" state.

The wake-up state and the entering-sleep state may have overhead in power consumption. Normally the power consumption may be higher during both the wake-up state and the entering-sleep state when compared to that of the PM sleep state. Also normally the power consumption may be lower during both the wake-up state and the entering-sleep state when compared to that of the PM active state. Typically the transition time for the wake-up state is longer than the transition time for the entering-sleep state. Also in general the power consumption during the wake-up state may be higher than that of during the entering-sleep state. An example of PM sleep state to wake-up state then to PM active state then to entering-sleep state and then back to sleep state transitions in a battery operated client terminal is illustrated in FIG. 2. As and when appropriate, the client terminal may enter into PM sleep state and PM active state and an example is illustrated in FIG. 3. For the description of the present disclosure herein, the wake-up state and the entering-sleep state may not be explicitly discussed or shown in the drawings but they always exist.

The client terminal may transition from PM sleep state to PM active state to receive in the downlink or transmit in the uplink or both. Some hardware and software components may be specific to receive in the downlink or transmit in the uplink and they may be independently turned on or turned off based on receive in the downlink or transmit in the uplink respectively. Some hardware and software components in the client terminal may be common for both receive in the downlink and transmit in the uplink and may have to be turned on for either receive in the downlink or transmit in the uplink.

Typically, a client terminal may operate in one of five different functional states: (i) power-on state; (ii) idle state; (iii) access state; (iv) connected state and (v) power-save state. Typical functional state transitions in a client terminal are illustrated in FIG. 4. Typically, in the power-on functional state the client terminal may check for the available base stations, may synchronize with the network and may attempt to camp on to the best suitable base station. Typically, in the idle functional state the client terminal may check and/or periodically receive broadcast and/or multicast messages in the DL direction. Typically, in the access functional state, the client terminal may access the base station to establish connection with the base station. Typically, in the connected functional state the client terminal and the base station may communicate with each other through DL and/or UL to receive and/or to send control information and/or user payload data, may receive broadcast messages and/or may receive multicast messages. In the connected functional state the client terminal may operate in PM active states in all the frames and may operate in PM sleep states within the frame. Typically, in the power-save functional state the client terminal and the base station may communicate with each other through DL and UL to send and receive control information and/or user payload data, may receive broadcast messages and/or may receive multicast message. In power-save functional state the client terminal may operate in PM active states in frames when there is data to receive in DL and/or when there is data to send in UL and in other frames it may operate in PM sleep state.

Once a client terminal is turned on, it may camp onto the wireless communication network, may receive the latest network information, may register to the network, may periodically receive the latest network information, and may be ready to establish connection with the wireless communication network. For a battery operated client terminal, to increase the battery usage time, it is desirable to operate a client terminal in the PM sleep state as much as possible without compromising user experience.

A base station to which the client terminal may be downlink synchronized and/or communicating with at any given time is referred herein as the Serving Base Station (SBS). In some wireless communication systems the serving base station is normally referred to as the serving cell. The base stations that are in the vicinity of the serving base station are called Neighbor Base Stations (NBS). Similarly, in some wireless communication systems a neighbor base station is normally referred to as a neighbor cell. While in practice a cell may include one or more base stations, distinction is not made between a base station and a cell, and such terms may be used interchangeably herein.

After initially synchronizing with a cell, a client terminal may switch to another cell depending on the signal conditions, network congestion, and other criteria. The process of switching from one cell to another cell by a client terminal is often referred as handover ("HO") or cell reselection. In some wireless communication systems handover is also referred to as handoff. Also in some wireless communication systems cell reselection is also referred to as idle mode handoff. Normally, in mobile wireless communication systems, client terminals switch over from one cell to another as signal conditions change. The signal conditions may change due to the movement of the client terminals or due to change in network traffic conditions or change in the surroundings of the client terminal or the combination of any of these factors. An NBS to which a client terminal may be switching over its communication from the current SBS is herein referred to as Target Base Station (TBS). In some wireless communication systems a target base station is normally referred to as a target cell. Sometimes during a handover, the serving cell and the target cell may be the same and only the channel used for communication may be changed. Such a handover, in which the cell is not changed, is called an intra-cell handover. The purpose of intra-cell handover may be that the new channel is better suited for communication than the previous channel within the same cell.

The decision making process for handovers and cell reselections varies from one wireless communication system to another. However, the decisions are generally based on the signal conditions measurements by the client terminals and reporting of those measurements to the wireless communication network by the client terminals. The wireless communication network generally may influence and control the measurements and reporting process of the client terminal by providing parameters for the measurement and reporting process. The actual decision to perform handover may be made either by the network or by the client terminal depending on the type of particular wireless communication system. On the other hand the cell reselection decisions in idle mode may be generally performed autonomously by the client terminal. Both Handovers and cell reselections may normally lead to change of cell from which the client terminal may access communication services. The difference between the handover procedure and cell reselection procedure depends generally on whether a client terminal is engaged in an active connection with the wireless communication network. The term handover may be used herein to refer to handover or cell reselection or both. The actual process of handover or cell reselection may be inferred based on the context.

Typically in a wireless communication the base station may group the system information and each group of system information may be transmitted as multiple broadcast messages and such broadcast messages are herein referred as system parameter messages. The system parameter messages may carry important system information without which the client terminal may not be able to communicate with the wireless communication network. The wireless communication network may transmit these system parameter messages at regular intervals in such a way that any client terminal that enters its coverage area may receive these system parameter messages and may be able to communicate with the wireless communication network at the earliest possible time. Client terminals that are already in the base station's coverage area may also periodically receive these system parameter messages for possible updates. Normally a client terminal may store the system parameter messages in its memory for the current SBS.

Typically, system parameter messages may carry a Configuration Change Count Indicator (CCCI) parameter. Normally a base station may change the value of CCCI in the system parameter message to indicate to the client terminals about the change in the information in that system parameter message. A client terminal may check the value of the CCCI to identify if any of the information in a system parameter message has been changed. If the value of CCCI has not changed, a client terminal may not receive and/or may not process the remaining part of that system parameter message. If the value of CCCI has changed, then the client terminal may receive and may process that system parameter message to get the updated information in that system parameter message.

Typically, in some wireless communication systems where there may be multiple system parameter messages broadcast by a base station, all system parameter messages may carry the same value of CCCI. In some wireless communication systems where there are multiple system parameter messages broadcast by a base station, one or more system parameter messages may carry a different value of CCCI. In some wireless communication systems where there are multiple system parameter messages broadcast by a base station, each system parameter message may carry different value of CCCI.

Typically, in some wireless communication systems, the base station may periodically transmit broadcast messages which may have the CCCI(s) of system parameter messages. The broadcast message that carries the CCCI(s) of system parameter messages is herein referred to as page message. Typically when there is a change in one or more of the system parameter messages, the base station may change the value of CCCI(s) in those system parameter messages and may change the value of the corresponding CCCI(s) in the page message. When a client terminal receives a page message, it may check the values of CCCI(s) for any change in the system parameter messages. If the value(s) of CCCI(s) are not changed, the client terminal may not receive or may not process those system parameter messages. If the value(s) of CCCI(s) are changed in the page message, then the client terminal may receive and may process those system parameter messages to get the updated information in those system parameter messages.

In some wireless communication systems, the client terminals may be required to periodically receive certain system parameter messages for the selective list of NBSs in addition to receiving the system parameter messages of the SBS. For such wireless communication systems, the client terminals may be required to periodically update the system parameter messages if there is any change in them for the selective list of NBSs in the similar manner the client terminal updates the system parameter messages for the SBS. The period at which the client terminal may have to update the system parameter messages for the SBS and for the NBS may be different. For example, in Global System for Mobile Communications (GSM), the client terminal may be required to receive system parameter messages for the SBS and/or certain system parameter messages for the selective list of NBSs and the period to update the system parameter messages may be different for the SBS and the NBSs. Typically, for a given SBS, the selective list of NBSs is normally broadcast by the SBS.

Typically, in wireless communication systems, most of the system parameter messages may not change frequently. For example, some system parameter messages may change once or twice a day and some system parameter messages may not change for many days.

Typically, when a client terminal switches to a new base station due to cell reselection or handover, it may be required to receive system parameter messages for the new SBS. In some wireless communication systems, when a client terminal switches to a new base station due to cell reselection or handover, it may be required to receive the system parameter messages for the new SBS and certain system parameter messages for the selective list of NBSs corresponding to the new SBS.

In wireless communication systems, the normal use case scenario of a client terminal may be to operate in a specific geographical area. For example, one typical use case scenario of a portable battery operated client terminal, such as a cellular handset during weekdays of a week, may be that a user may carry the mobile client terminal from home to work and nearby areas and back to home. For this typical use case scenario, a client terminal may get service from a set of base stations in the wireless communication network. FIG. 5A illustrates an example use case scenario, in which a user may carry the client terminal from home ("A") to work ("B") and back from work ("B") to home ("A") during weekdays of a week. For this example use case scenario, a client terminal may get service from base stations 2, 4, 3, 6 and 9 while the user carries the client terminal to go from home to work and the client terminal may get service from base stations 9, 6, 3, 4 and 2 when the user carries the client terminal to go from work to home. Another typical use case scenario may be that the user for most of the time may use the client terminal at home ("C") as shown in FIG. 5B and the client terminal may get service from base stations 4, 6 and 7 and may do frequent handover or cell reselection based on the available service quality from the base stations 4, 6 and 7. Yet another typical use case scenario is that a user may use a client terminal at work ("D") as shown in FIG. 5B during the work hours and the client terminal may get service from base stations 10, 12 and 13 and may do frequent handover or cell reselection based on the available service quality from the base stations 10, 12 and 13.

Normally the client terminal may operate in the functional idle state for most of the time. In the idle state the client terminal may be required to periodically receive and update the system parameter messages and may be required to receive the multicast messages. As the signal conditions change, a client terminal may perform cell reselection or handover to get the service from a more suitable cell. When the client terminal switches to a different cell, it may be required to receive all the system parameter messages for the new SBS as well as may be required to receive certain system parameter messages for the selective list of cells that are NBSs for the new SBS. In traditional client terminals, once a client terminal switches to a new cell it may not keep the system parameter messages of the previous SBS. Also in some wireless communication systems where a client terminal may be required to periodically receive system parameter messages of the selective list of NBSs, when a client terminal switches the SBS, the selective list of NBSs for the current SBS also may change and a traditional client terminal may discard the system parameter messages of the base stations that are not part of the current serving base station's NBSs list.

The set of all system parameter messages broadcast by a base station is herein referred to as "base station broadcast system information." Similarly the set of all multicast information transmitted by a base station is herein referred to as "base station multicast system information."

SUMMARY

A method and apparatus are disclosed that may avoid receiving all or most of the system parameter messages broadcast by a base station that may not change over a period of time. The disclosed method and apparatus also may avoid receiving all or most of the multicast system information messages transmitted by the base station that may not change over a period of time. The method and apparatus may enable significant reduction of the PM active state of a client terminal and may lead to significant reduction in power consumption in client terminals, which may be a significant advantage for battery operated client terminals. The disclosed method and apparatus may also reduce the time required by the client terminal to get connected or reconnected to a base station and it may lead to reduced latency service and better user experience.

In accordance with an aspect of the present invention, a method for storing new base station system information in a wireless communication network may include: controlling, by a processing device, steps of: (I) determining whether an entry exists in a base stations information base (BSIB) for a Base Station Identity (BSID) of a base station for which the new base station system information is received, (A) when the entry in the BSIB is determined to exist for the BSID of the base station for which the new base station system information is received, determining whether a Base Station Information Validity Flag (BSIVF) of the entry for the BSID of the base station is equal to a first value, and updating the entry for the BSID of the base station in the BSIB with the new base station system information, when the BSIVF of the entry for the BSID of the base station is determined to be equal to the first value, and updating the entry for the BSID of the base station in the BSIB with the new base station system information and stopping a Passive Base Station Information Validity Timer (PBSIVT) of the entry for the BSID of the base station, in which the PBSIVT has a timer value Tp, when the BSIVF of the entry for the BSID of the base station is determined not to be equal to the first value, (B) when the entry in the BSIB is determined not to exist for the BSID of the base station for which the new base station system information is received, (i) determining whether a second entry exists in the BSIB having a BSIVF thereof equal to a second value, and when the second entry having the BSIVF thereof equal to the second value is determined to exist in the BSIB, adding the new base station system information to the second entry, and when the second entry having the BSIVF thereof equal to the second value is determined not to exist in the BSIB, determining whether at least one third entry exists in the BSIB having a BSIVF thereof equal to a third value, and when the at least one third entry having the BSIVF thereof equal to the third value is determined to exist, stopping a PBSIVT of the at least one third entry having a lowest value Tp and replacing base station information of the at least one third entry having the lowest value Tp with the new base station system information, and when the at least one third entry having the BSIVF thereof equal to the third value is determined not to exist, for a fourth entry in the BSIB having a BSIVF thereof equal to the first value and an Active Base Station Information Validity Timer (ABSIVT), in which the ABSIVT has a timer value Ta, with a lowest value Ta, stopping the ABSIVT and replacing base station information for the fourth entry with the new base station system information; and (II) starting or restarting an ABSIVT of a fifth entry, in which the fifth entry is (i) when one entry of the entry, the second entry and the at least one third entry is determined to exist, the one entry, and (ii) when the entry, the second entry and the at least one third entry are determined not to exist, the fourth entry, setting a BSIVF of the fifth entry equal to the first value, when an ABSIVT of the fifth entry is determined to expire based on monitoring of a timer value Ta thereof, setting the BSIVF for the fifth entry equal to the third value, and starting a PBSIVT for the fifth entry, and when the PBSIVT for the fifth entry is determined to expire based on monitoring of a timer value Tp thereof, setting the BSIVF for the fifth entry equal to the second value.

In one alternative, base station system information for N most recent Serving Base Stations (SBS) may be stored as the BSIB.

In one alternative, all available latest base station system information received from the N most recent SBS and associated Configuration Change Count Indicator (CCCI) values may be stored in the BSIB.

In one alternative, each entry in the BSIB may have an ABSIVT and an PBSIVT.

In one alternative, each entry in the BSIB may have BSIVF.

In one alternative, when a communication device in the network in which the BSIB is stored is powered on, a BSIVF of each entry in the BSIB may be set to the second value.

In one alternative, the BSID may be a Physical Cell Identity (PCI) or a Global Cell Identity (GCI).

In one alternative, the PCI may be obtained by decoding a physical layer signal, and the GCI may be obtained by decoding a system information message.

In one alternative, when a client terminal in the network has a non-volatile storage, a current state of the BSIB may be stored in the non-volatile memory, and the method may further include controlling, by the processing device, when the client terminal is powered off and then powered on again, selecting one base station using the current state of the BSIB stored in the non-volatile storage and updating the BSIB only when an update is required based on status of BSIVF in the current state of the BSIB.

In one alternative, a current state of the BSIB may be stored in a memory of a client terminal in the network whose contents is not lost when the client terminal is operating in an airplane mode, and the method may further include controlling, by the processing device, when the client terminal switches to normal mode from the airplane mode, selecting one base station using the current state of the BSIB stored in the memory and updating the BSIB only when an update is required based on status of BSIVF in the current state of the BSIB, and when the client terminal is unable to select the one base station using the current state of the BSIB stored in the memory, setting a BSIVF of each of N entries of the BSIB equal to the second value.

In one alternative, the method may further include controlling, by the processing device, when the entry is determined to exist for the BSID of the base station and have a BSIVF thereof equal to the first value and an ABSIVT of the entry for the BSID of the base station is determined to be running, updating the entry for the BSID of the base station in the BSIB with the new base station system information and restarting the ABSIVT of the entry.

In one alternative, the second entry having the BSIVF thereof equal to the second value may be determined to exist in the BSIB, when a client terminal in the network camps onto any new base station, performs base station reselection or hands over to a new base station.

In one alternative, the method may further include: controlling, by the processing device, when the at least one third entry having the BSIVF thereof equal to the third value is determined to exist, starting an ABSVIT of the fifth entry. In one alternative, the method may further include: controlling, by the processing device, when the entry in the BSIB is determined to exist for the BSID of the base station and a page message or a system parameter message which includes a Configuration Change Count Indicator (CCCI) is determined to be received for the BSID of the base station, determining whether a value of the CCCI of the message received is same as a value of a CCCI in a message stored in the entry, and when the value of the CCCI of the message received is determined not to be the same as the value of CCCI in the message stored in the entry, updating system information in the entry with parameters of the page message or system parameter message received, and determining whether the entry has the BSIVF thereof equal to the first value, and when the entry is determined not to have the BSIVF thereof equal to the first value, stopping a PBSIVT of the sixth entry.

In one alternative, the method may further include: controlling, by the processing device, when a communication device in the network that stores the BSIB is performing base station reselection or hand over to the base station for which the new base station system information is received, a sixth entry is determined to exist in the BSIB for the BSID of the base station having a BSIVF thereof equal to the first value or the third value, the new base station system information carries a Configuration Change Count Indicator (CCCI) value, and a CCCI value for the second entry or the at least one third entry is same as the CCCI value of the new base station system information, without performing step (I) and step (II), starting or restarting an ABSIVT of the sixth entry, setting the BSIVF of the sixth entry equal to the first value, and when the ABSIVT of the sixth entry is determined to expire based on monitoring of a timer value Ta thereof, setting the BSIVF for the sixth entry equal to the third value, and starting a PBSIVT for the sixth entry, and when the PBSIVT for the sixth entry is determined to expire based on monitoring of a timer value Tp thereof, setting the BSIVF for the sixth entry equal to the second value.

In one alternative, the method may further include: controlling, by the processing device, when a communication device in the network that stores the BSIB is to connect to the base station immediately after the communication performs base station reselection or handover, the new base station system information carries a Configuration Change Count Indicator (CCCI) value, and a CCCI value in the BSIB is same as the CCCI value of the new base station system information, connecting to the base station using system information stored in the BSIB without using the new base station system information.

In one alternative, at least one of broadcast base station system information or multicast system information may be stored as the BSIB, and the new base station system information may include at least one of new base station broadcast system information or new base station multicast system information.

In one alternative, the base station system information for N most recent Serving Base Stations (SBS) may be stored as the BSIB, and the base station system information may include base station multicast system information for the N most recent SBS.

In one alternative, timer values Ta and Tp for respective ABSIVT and PBSIVT of each entry in the BSIB having the base station system information may be determined by at least one of a simulation or field data analysis.

In one alternative, a number of Serving Base Stations (SBS) for which the base station broadcast system information is stored in the BSIB may be different than a number of SBSs for which the base station multicast system information is stored in the BSIB.

In one alternative, base station system information for M latest Neighboring Base Stations (NBS) may be stored with the base station system information for the N most recent SBS as the BSIB.

In one alternative, when any SBS in the BSIB becomes a new NBS, the base station system information for the SBS becomes the base station system information for the new NBS for unchanged base station system information.

In one alternative, when any NBS in the BSIB becomes a new SBS, the base station system information for the NBS becomes the base station system information for the new SBS for unchanged base station system information.

In accordance with an aspect of the present invention, an apparatus for storing new base station system information in a wireless communication network may include: circuitry configured to control operations of: (I) determining whether an entry exists in a base stations information base (BSIB) for a Base Station Identity (BSID) of a base station for which the new base station system information is received, (A) when the entry in the BSIB is determined to exist for the BSID of the base station for which the new base station system information is received, determining whether a Base Station Information Validity Flag (BSIVF) of the entry for the BSID of the base station is equal to a first value, and updating the entry for the BSID of the base station in the BSIB with the new base station system information, when the BSIVF of the entry for the BSID of the base station is determined to be equal to the first value, and updating the entry for the BSID of the base station in the BSIB with the new base station system information and stopping a Passive Base Station Information Validity Timer (PBSIVT) of the entry for the BSID of the base station, in which the PBSIVT has a timer value Tp, when the BSIVF of the entry for the BSID of the base station is determined not to be equal to the first value, (B) when the entry in the BSIB is determined not to exist for the BSID of the base station for which the new base station system information is received, (i) determining whether a second entry exists in the BSIB having a BSIVF thereof equal to a second value, and when the second entry having the BSIVF thereof equal to the second value is determined to exist in the BSIB, adding the new base station system information to the second entry, and when the second entry having the BSIVF thereof equal to the second value is determined not to exist in the BSIB, determining whether at least one third entry exists in the BSIB having a BSIVF thereof equal to a third value, and when the at least one third entry having the BSIVF thereof equal to the third value is determined to exist, stopping a PBSIVT of the at least one third entry having a lowest value Tp and replacing base station information of the at least one third entry having the lowest value Tp with the new base station system information, and when the at least one third entry having the BSIVF thereof equal to the third value is determined not to exist, for a fourth entry in the BSIB having a BSIVF thereof equal to the first value and an Active Base Station Information Validity Timer (ABSIVT), in which the ABSIVT has a timer value Ta, with a lowest value Ta, stopping the ABSIVT and replacing base station information for the fourth entry with the new base station system information; and (II) starting or restarting an ABSIVT of a fifth entry, in which the fifth entry is (i) when one entry of the entry, the second entry and the at least one third entry is determined to exist, the one entry, and (ii) when the entry, the second entry and the at least one third entry are determined not to exist, the fourth entry, setting a BSIVF of the fifth entry equal to the first value, when an ABSIVT of the fifth entry is determined to expire based on monitoring of a timer value Ta thereof, setting the BSIVF for the fifth entry equal to the third value, and starting a PBSIVT for the fifth entry, and when the PBSIVT for the fifth entry is determined to expire based on monitoring of a timer value Tp thereof, setting the BSIVF for the fifth entry equal to the second value.

In accordance with an aspect of the present invention, a wireless communication device may include a receiver to receive new base station system information in a wireless communication network, and a processing device to control operations of: (I) determining whether an entry exists in a base stations information base (BSIB) for a Base Station Identity (BSID) of a base station for which the new base station system information is received, (A) when the entry in the BSIB is determined to exist for the BSID of the base station for which the new base station system information is received, determining whether a Base Station Information Validity Flag (BSIVF) of the entry for the BSID of the base station is equal to a first value, and updating the entry for the BSID of the base station in the BSIB with the new base station system information, when the BSIVF of the entry for the BSID of the base station is determined to be equal to the first value, and updating the entry for the BSID of the base station in the BSIB with the new base station system information and stopping a Passive Base Station Information Validity Timer (PBSIVT) of the entry for the BSID of the base station, in which the PBSIVT has a timer value Tp, when the BSIVF of the entry for the BSID of the base station is determined not to be equal to the first value, (B) when the entry in the BSIB is determined not to exist for the BSID of the base station for which the new base station system information is received, (i) determining whether a second entry exists in the BSIB having a BSIVF thereof equal to a second value, and when the second entry having the BSIVF thereof equal to the second value is determined to exist in the BSIB, adding the new base station system information to the second entry, and when the second entry having the BSIVF thereof equal to the second value is determined not to exist in the BSIB, determining whether at least one third entry exists in the BSIB having a BSIVF thereof equal to a third value, and when the at least one third entry having the BSIVF thereof equal to the third value is determined to exist, stopping a PBSIVT of the at least one third entry having a lowest value Tp and replacing base station information of the at least one third entry having the lowest value Tp with the new base station system information, and when the at least one third entry having the BSIVF thereof equal to the third value is determined not to exist, for a fourth entry in the BSIB having a BSIVF thereof equal to the first value and an Active Base Station Information Validity Timer (ABSIVT), in which the ABSIVT has a timer value Ta, with a lowest value Ta, stopping the ABSIVT and replacing base station information for the fourth entry with the new base station system information; and (II) starting or restarting an ABSIVT of a fifth entry, in which the fifth entry is (i) when one entry of the entry, the second entry and the at least one third entry is determined to exist, the one entry, and (ii) when the entry, the second entry and the at least one third entry are determined not to exist, the fourth entry, setting a BSIVF of the fifth entry equal to the first value, when an ABSIVT of the fifth entry is determined to expire based on monitoring of a timer value Ta thereof, setting the BSIVF for the fifth entry equal to the third value, and starting a PBSIVT for the fifth entry, and when the PBSIVT for the fifth entry is determined to expire based on monitoring of a timer value Tp thereof, setting the BSIVF for the fifth entry equal to the second value.

BRIEF DESCRIPTION OF THE DRAWINGS

FIGS. 7A, 7B, 7C, and 7D illustrate flow diagrams of the management of base station broadcast system information for N latest serving base stations in accordance with aspects of the present invention.

DETAILED DESCRIPTION

Figure 1:
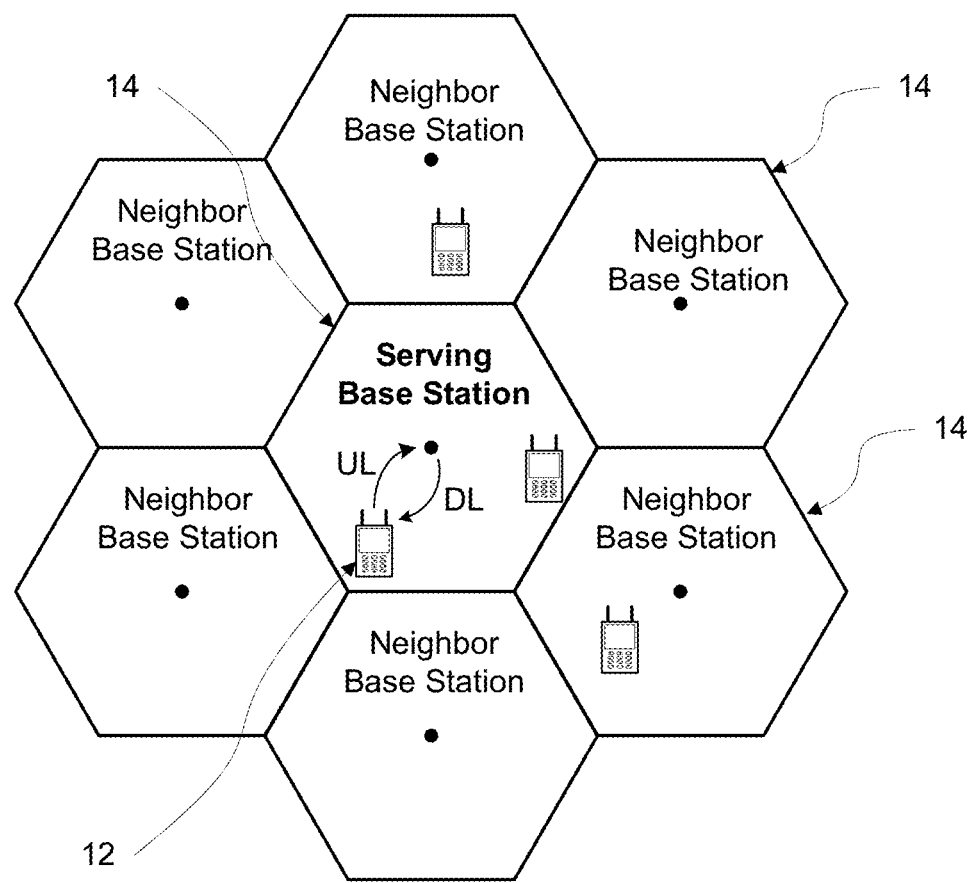
FIG. 1 illustrates a conventional mobile wireless communication system.
Figure 2:
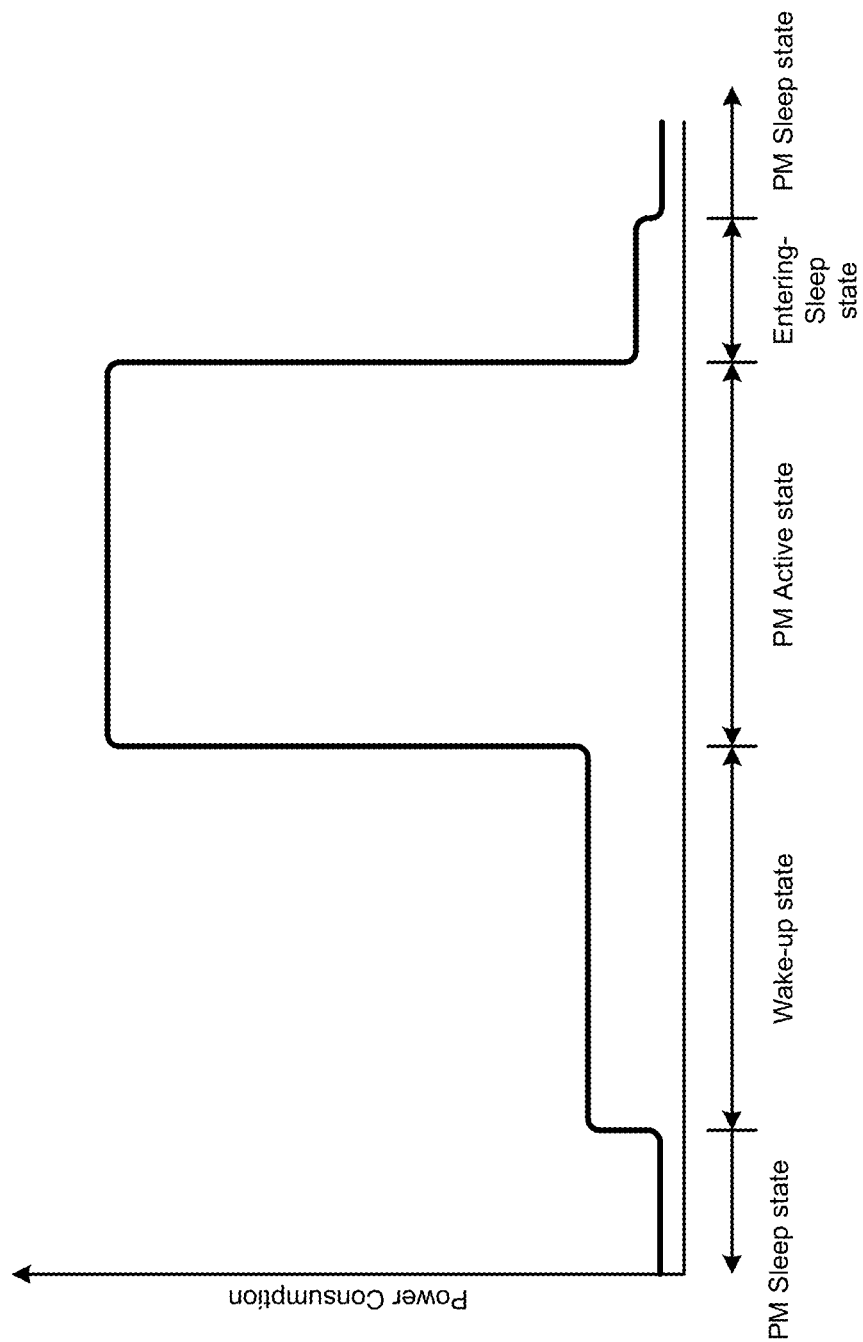
FIG. 2 illustrates the PM Sleep state, Wake-up state, PM Active state and Entering-sleep state in a client terminal.
Figure 3:
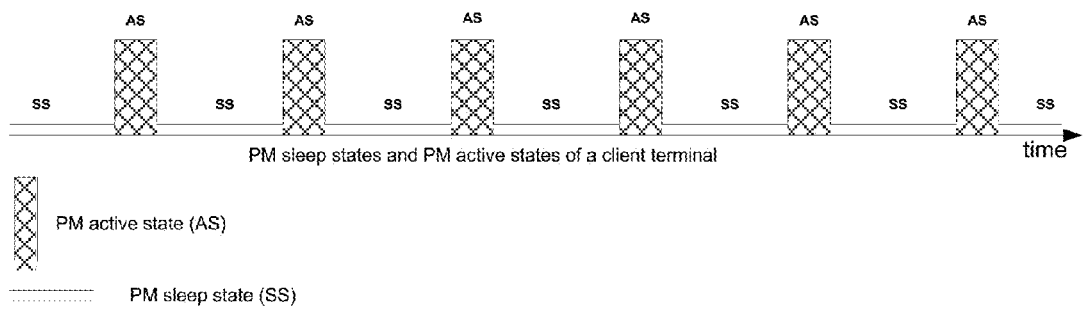
FIG. 3 illustrates client terminal entering into PM sleep states and PM active states.
Figure 4:
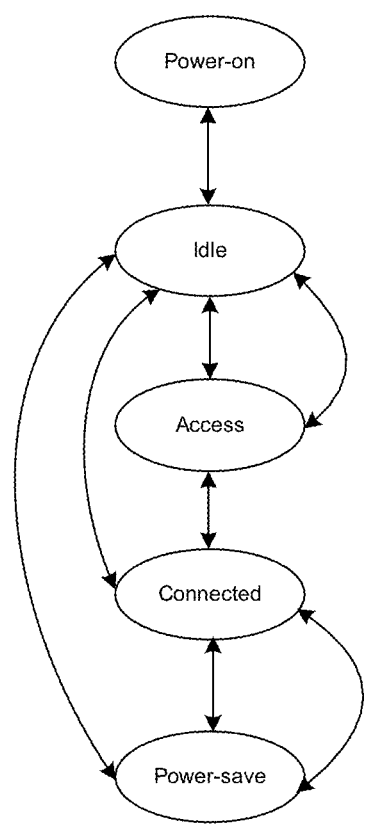
FIG. 4 illustrates typical state transitions in a client terminal.
Figure 5A:
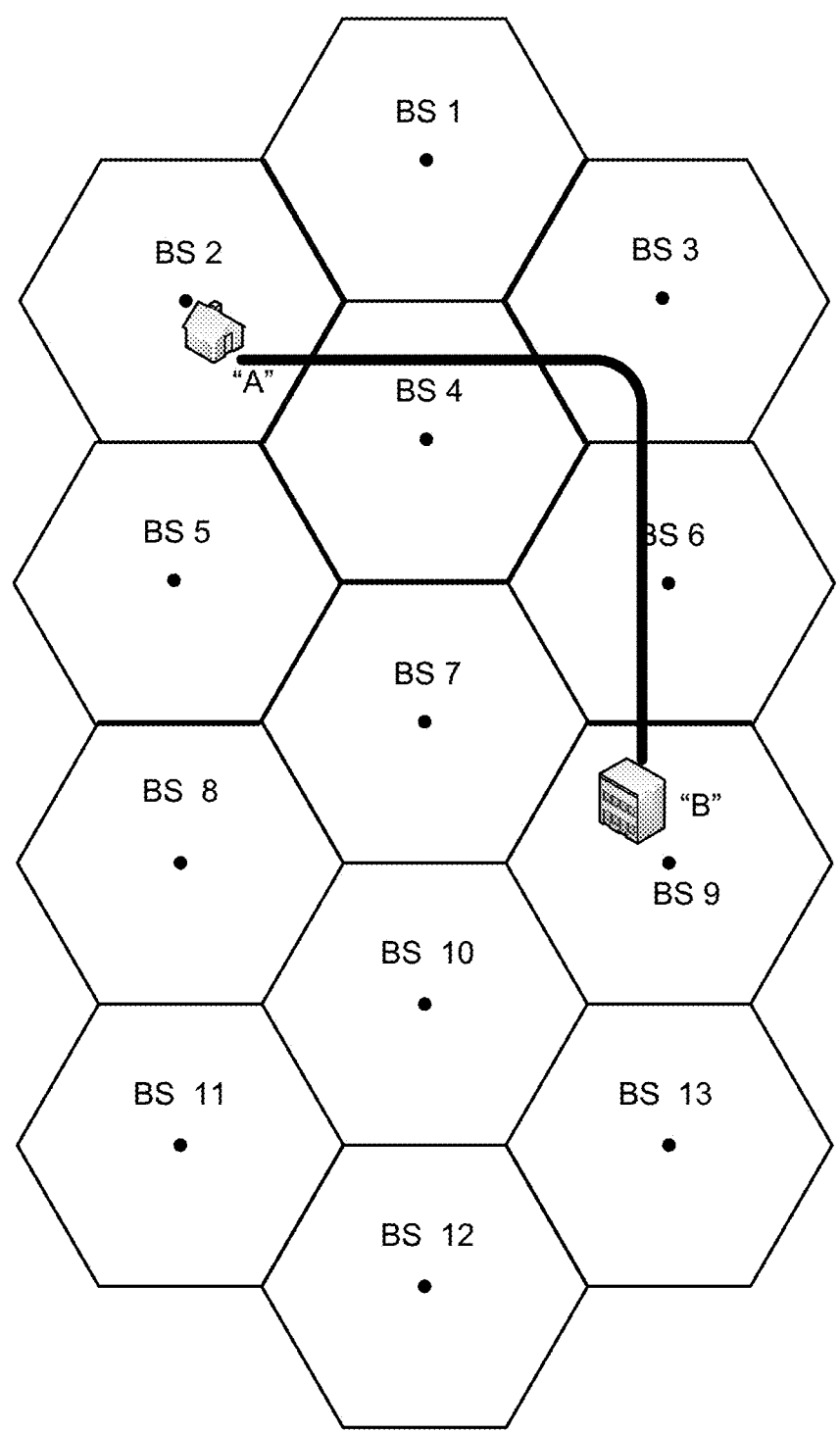
FIGS. 5A and 5B illustrate typical use case scenarios of the client terminal in a mobile wireless communication system.
Figure 5B:
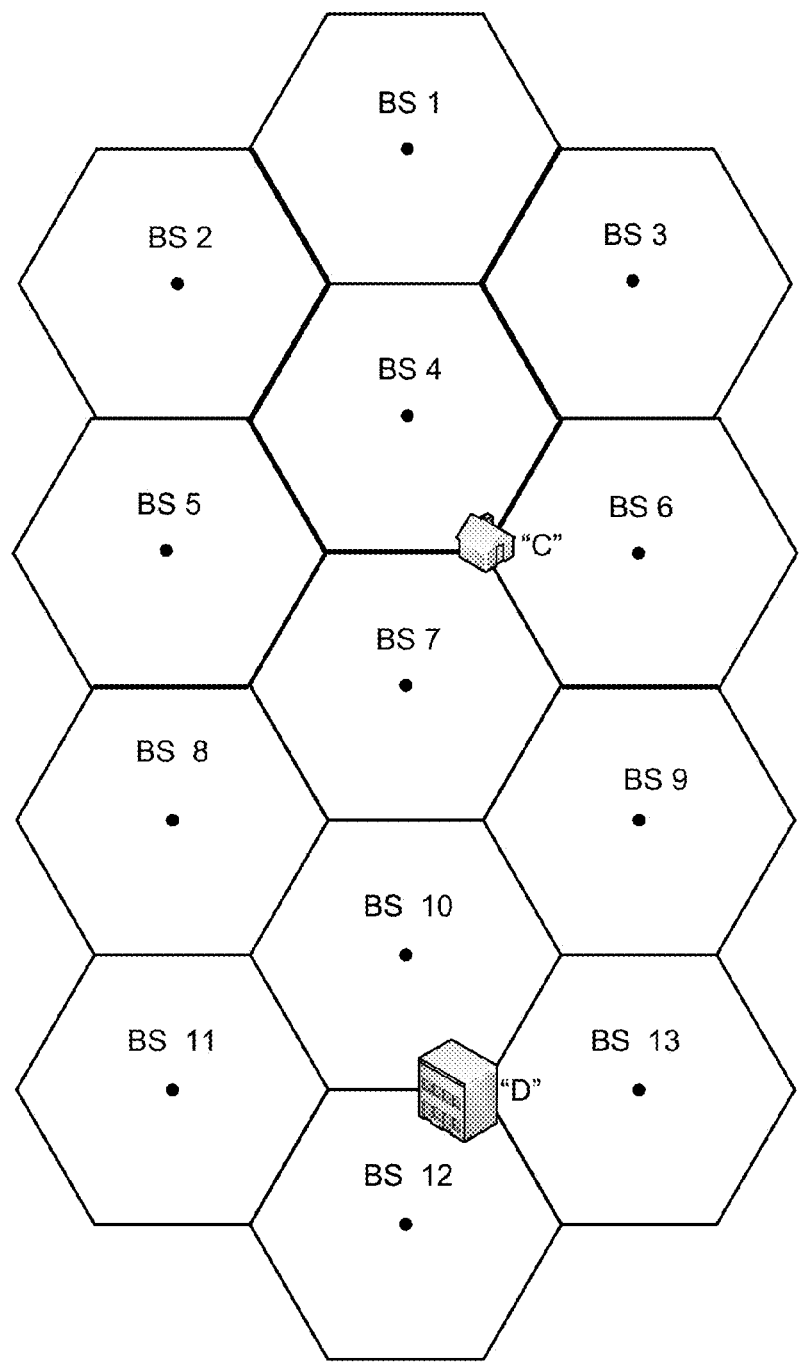

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the invention is not intended to be limited to the specific terms used.

Method and apparatus are described herein to reduce the number of times a client terminal may be in a PM active state and to reduce the duration of each instance of the PM active state by storing, managing and using the broadcast system information and multicast system information of N latest SBSs and the broadcast system information of M latest NBSs.

According to an aspect of the present invention, a client terminal may store N most recent SBS broadcast system information in its memory and the stored broadcast system information are herein referred as Base Stations Information Base (BSIB). A client terminal may store all the available latest broadcast system information received from the N most recent SBSs and its associated CCCI value in the BSIB. The storage for one base station's broadcast system information in the BSIB is herein referred to as an entry and hence there may be N entries in the BSIB. The value of N may vary for different wireless communication systems and may vary for different configuration of the same wireless communication system. The value of N may be determined by simulations, field data analysis, or a combination of both. Once determined, a given value may be programmed to a register by the firmware in a controller/processor of a client terminal such as the Micro Controller Unit (MCU) or Signal Processing Unit (SPU). For example, the value of N may be chosen to be 20. The minimum value of N is 1. The maximum value of N may be limited by the amount of available memory in the client terminal and other practical constraints.

According to another aspect of the present invention, a client terminal may have two timers associated with each entry in BSIB and the timers are herein referred as Active Base Station Information Validity Timer (ABSIVT) and Passive Base Station Information Validity Timer (PBSIVT). A client terminal may start or restart the ABSIVT when it adds a new base station broadcast system information to the BSIB or when there is an update in the base station broadcast system information and the BSIB entry for that base station is updated. When the ABSIVT expires for an entry then the client terminal may start the PBSIVT for that entry.

Let Ta denote the value of ABSIVT. The value of Ta may be determined by simulations, field data analysis, or a combination of both. Once determined, a given value may be programmed to a register by the firmware in a controller/processor of a client terminal such as the MCU or SPU. The value may be on the order of a few tens of minutes to a few hours and it may vary for different network configurations in different wireless communication systems. For example, Ta may be chosen to be 60 minutes.

Let Tp denote the value of PBSIVT. The value of Tp may be determined by simulations, field data analysis, or combination of both. Once determined, a given value may be programmed to a register by the firmware in a controller/processor of a client terminal such as the MCU or SPU. The value may be on the order of few hours and it may vary for different network configurations in different wireless communication systems. For example, Tp may be chosen to be 12 hours.

Figure 6:
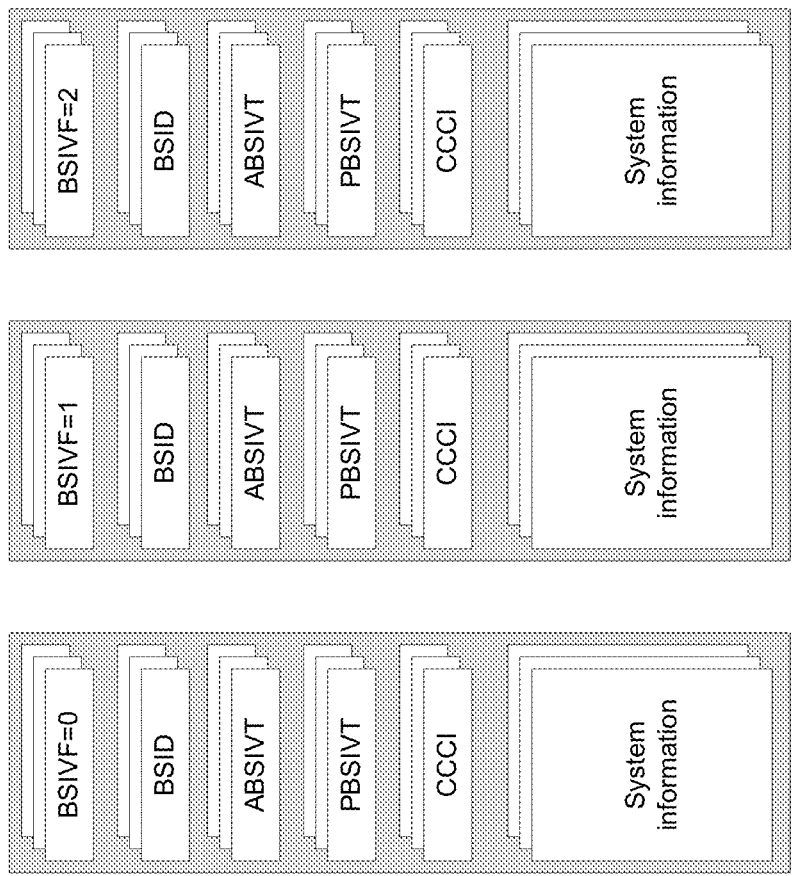
FIG. 6 illustrates an example structure and organization of the Base Station Information Base (BSIB) at a given instance of time according to the aspects of the present invention.

According to another aspect of the present invention, a client terminal may have a status flag associated with each entry in BSIB and the status flag is herein referred as Base Station Information Validity Flag (BSIVF). The BSIVF in each entry of the BSIB may have the following three possible values at any given time: (i) BSIVF=0 in an entry indicates that the particular entry in the BSIB is not used and ABSIVT and PBSIVT may not be running and new base station information may be stored in that entry. (ii) BSIVF=1 in an entry indicates that the particular entry in the BSIB may be used and a base station information may be already stored in that entry and the ABSIVT may be running for that entry. (iii) BSIVF=2 in an entry indicates that the particular entry in the BSIB may be used and a base station information may be stored in that entry and the PBSIVT may be running for that entry. An example organization of the BSIB at a given instance of time is shown in FIG. 6. As shown in FIG. 6, the BSIB may group the database entries according to the value of the BSIVF. The BSIB entries for each cell may be identified by the Base Station Identity (BSID). As shown in FIG. 6, there may be multiple base station information entries in each of the three groups. When a client terminal is powered on, the BSIVF in all N entries of the BSIB may be initialized to 0. This means that all N entries in the BSIB are available for storing system information for new cells. When the BSIVF=2 for an entry and the time PBSIVT expires for that entry, the BSIVF is reset to 0 and the memory for that entry again becomes available for storing system information for a new cell.

According to an aspect of the present invention, the BSID used in the BSIB may be a shorter Physical Cell Identity (PCI) or a longer Global Cell Identity (GCI). A PCI may be reused by another cell that may be separated by some geographic distance whereas a GCI is never reused by any cell and it is globally unique. A PCI may be obtained by decoding physical layer signals from a cell. A GCI may be obtained by decoding one of the system information messages broadcast by a cell.

According to an aspect of the present invention, when a client terminal has a non-volatile storage available, such as a flash memory, it may store the current state of the BSIB into the non-volatile memory. When a client terminal is powered off and then powered on again, it may retrieve the stored BSIB from the non-volatile storage and use that information to perform the cell selection. Furthermore, it may update the BSIB only if required based on the status of the stored BSIVF.

Many client terminals support a mode known as "airplane mode" which allows a user to continue to use a client terminal while disabling the RF and modem functions of a client terminal. According to another aspect of the present invention, when entering the airplane mode, a client terminal may store the BSIB in the non-volatile storage or any other memory whose contents may not lost during airplane mode. When the airplane mode is disabled, i.e., entering normal mode of operation, a client terminal may retrieve the stored BSIB and may use that information to perform the cell selection. Furthermore, it may update the BSIB only if required based on the status of the stored BSIVF. If a client terminal is unable to find a suitable cell, the BSIVF in all N entries of the BSIB may be initialized to 0.

Figure 7A:
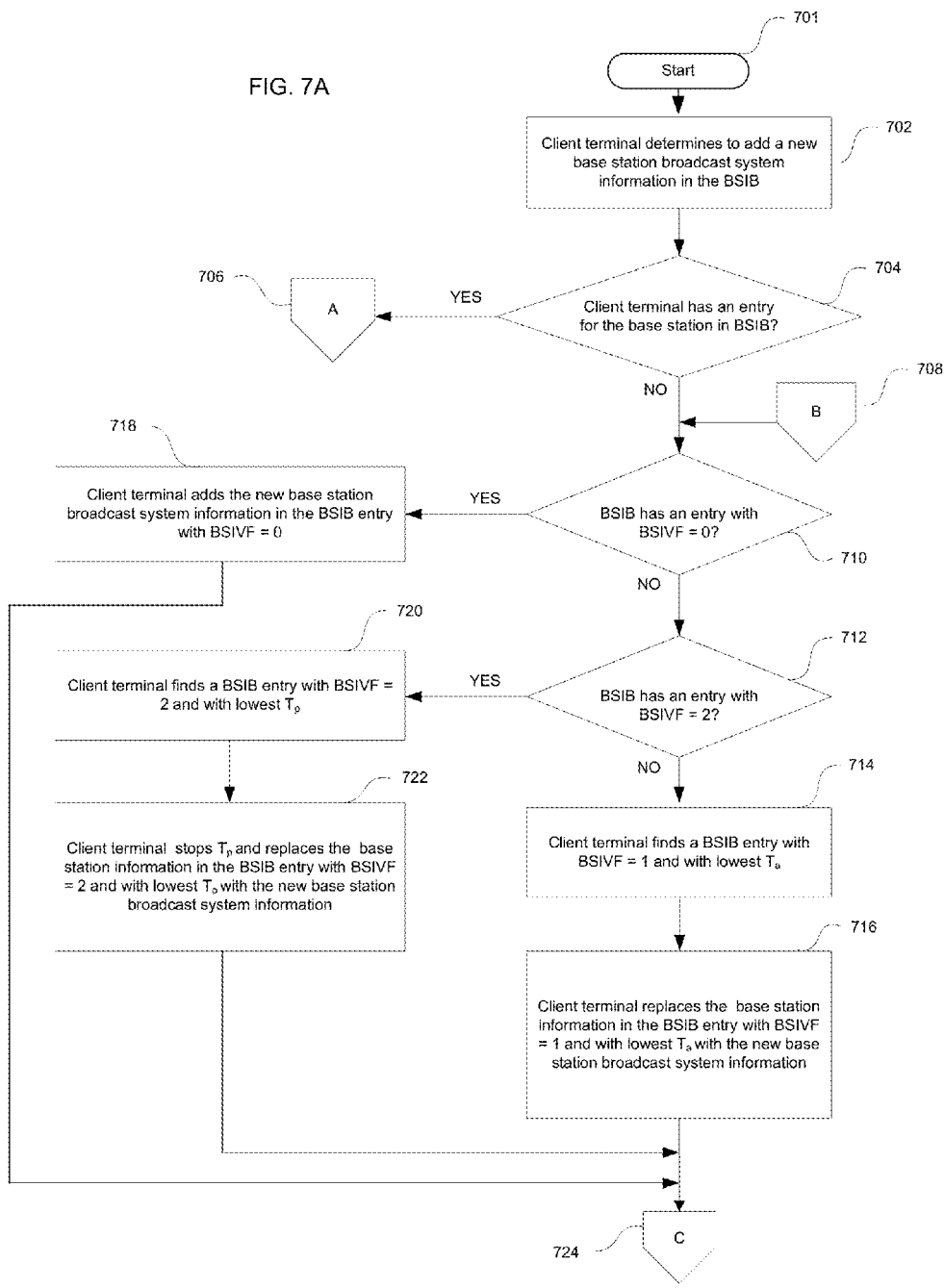
Figure 7B:
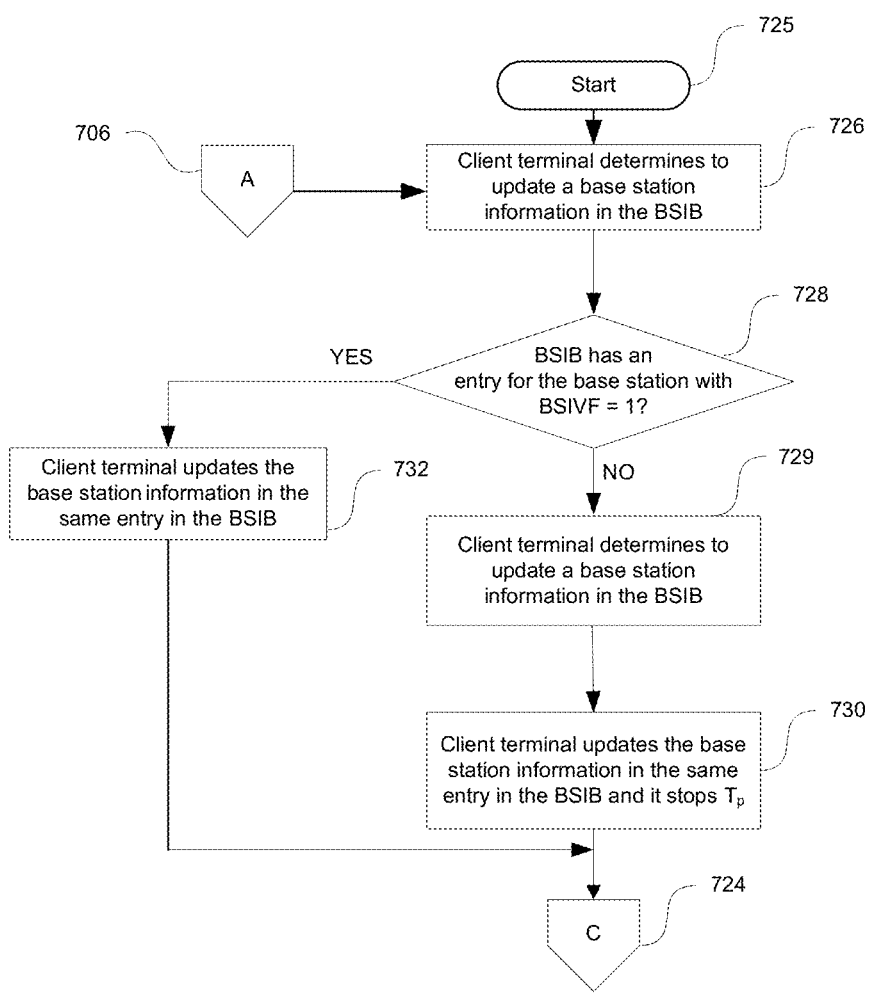

According to another aspect of the present invention whenever a client terminal receives the broadcast system information from any new base station, it may add it in the BSIB. The flow diagram of FIGS. 7A and 7B illustrates an algorithm in accordance with the aspects of the present invention that determines how the new base station broadcast system information is added in the BSIB. At processing stage 702, the processing relevant to the present invention begins. At this stage, the client terminal determines to add a new base station broadcast system information in the BSIB. The system information may be for a new cell for which there may not exist any entry in the BSIB. At processing stage 704, a determination is made whether an entry exists in the BSIB for the BSID of the cell. If an entry exists in the BSIB, the processing jumps to processing stage 706. If an entry does not exist in the BSIB, the processing continues at processing stage 710 where an entry with the BSIVF=0 is searched and if found, the processing continues at processing stage 718. At processing stage 718, the broadcast system information from the identified base station is added into the BSIB. The processing then continues at processing block 724. Returning to processing stage 710, if the BSIVF of the found entry is not equal to zero, the processing continues at processing stage 712. At processing stage 712, if the BSIVF of the found entry is 2, the processing continues at processing stage 720. At processing stage 720, a BSIB entry with BSIVF=2 and lowest Tp is found. Next at processing stage 722, the timer Tp is stopped and information in the found BSIB is replaced with the newly received broadcast system information. The processing then continues at processing block 724. Returning to the processing stage 712, if the BSIVF of the found entry is not equal to 2, the processing continues at processing stage 714. At processing stage 714, a BSIB entry with BSIVF=1 and lowest Ta is found. Next at processing stage 716, the timer Ta is stopped and information in the found BSIB is replaced with the newly received broadcast system information. The processing then continues at processing block 724.

The further processing in processing stage 724 is illustrated in the flow diagram contained in FIG. 7C. At processing stage 736, the client terminal start timer Ta or restarts a previously running timer Ta for the BSIB entry found in earlier processing stages such as the processing stages 704, 710, or 712 in FIG. 7A. Next at processing stage 738, the client terminal sets the BSIVF to 1 for BSIB entry found in earlier processing stages. At processing stage 740, the timer Ta is monitored until it expires. When the timer expires, the processing continues at processing stage 742. At processing stage 742, the client terminal sets the BSIVF to 2 for the BSIB entry found in earlier processing stages. At processing stage 744, the client terminal start timer Tp for the BSIB entry identified in earlier processing stages. At processing stage 746, the timer Tp is monitored until it expires. When the timer expires, the processing continues at processing stage 748. At processing stage 748, the client terminal sets the BSIVF to 0 for the BSIB entry. At processing stage 750 the processing relevant to the present scenario terminates.

Returning to the processing stage 706 in FIG. 7A, the further processing is illustrated in FIG. 7B. At processing stage 726, the client terminal determines that an entry exists in the BSIB for the BSID of a cell for which new broadcast system information is received. At processing stage 728, the BSIVF of the selected BSIB entry is checked. If the BSIVF is equal to 1, the processing continues at processing stage 732. At processing stage 732, the broadcast system information of the found entry is updated in the BSIB. The processing then continues at processing stage 724 which is already described earlier. Returning to processing stage 728, if the BSIVF is not equal to 1, the processing continues at processing stage 729 where it is determined that the BSIVF of the found BSIB entry is equal to 2. The processing continues at processing stage 730 where the broadcast system information of the found base station entry is updated in the BSIB and the timer Tp is stopped. The processing then continues is processing stage 724 which is already described earlier.

The above described method is one possible solution for adding the broadcast system information of a new base station to the BSIB and it is to be understood that these algorithms are merely illustrative of how the broadcast system information of a new base station may be added in the BSIB. It is therefore to be understood that numerous modifications may be made to the illustrative algorithms and that other arrangements may be devised without departing from the spirit and scope of adding the broadcast system information of a new base station to the BSIB.

According to another aspect of the present invention, when a client terminal receives the updated base station broadcast system information of a base station which has an entry in the BSIB with BSIVF set to 1 and Ta is running, then the client terminal may update the base station broadcast system information and restart Ta as per the algorithm illustrated in flow diagrams in FIGS. 7B and 7C. In this case the flow diagram in FIG. 7B is entered through the processing stage 725. The further processing is identical to the earlier description of the scenario where the processing flow is entered via the processing block 706 in FIG. 7B.

According to another aspect of the present invention, a client terminal may use the algorithm illustrated in the flow diagram in FIG. 7C to manage the base station broadcast system information once it is added to the BSIB or used to update the existing base station broadcast system information in the BSIB. When a client terminal adds a new base station broadcast system information or updates the base station broadcast system information, it starts or restarts Ta and set BSIVF to 1 as per the flow diagram illustrated in FIG. 7C.

According to yet another aspect of the present invention, when the timer Ta expires for any base station entry in the BSIB, a client terminal may set BSIVF to 2 for that base station entry in BSIB and start timer Tp as per the flow diagram illustrated in FIG. 7C.

According to yet another aspect of the present invention, when timer Tp expires for any base station entry in the BSIB, a client terminal may set the BSIVF to 0 for that base station entry in BSIB and may delete that base station entry from the BSIB as per the flow diagram illustrated in FIG. 7C.

According to another aspect of the present invention, when a client terminal camps onto any new base station or a client terminal does cell reselection or handover to a new base station and if the BSIB does not have an entry for the new base station, the client terminal may add an entry in the BSIB for the new base station broadcast system information according to the algorithm as illustrated in FIG. 7A and FIG. 7B in accordance with the aspects of invention.

According to another aspect of the present invention, a client terminal may use the algorithm illustrated in the flow diagram in FIG. 7C to manage the new base station broadcast system information once it is added to the BSIB.

According to another aspect of the invention, when a client terminal receives the updated base station broadcast system information about the base station which has an entry in the BSIB with BSIVF set to 2 and timer Tp is running, then the client terminal may update the base station broadcast system information, stop timer Tp for that base station entry, and may start timer Ta for that base station entry and may set BSIVF to 1 for that base station entry as per the algorithm illustrated in flow diagrams in FIG. 7B and FIG. 7C.

Figure 7D:
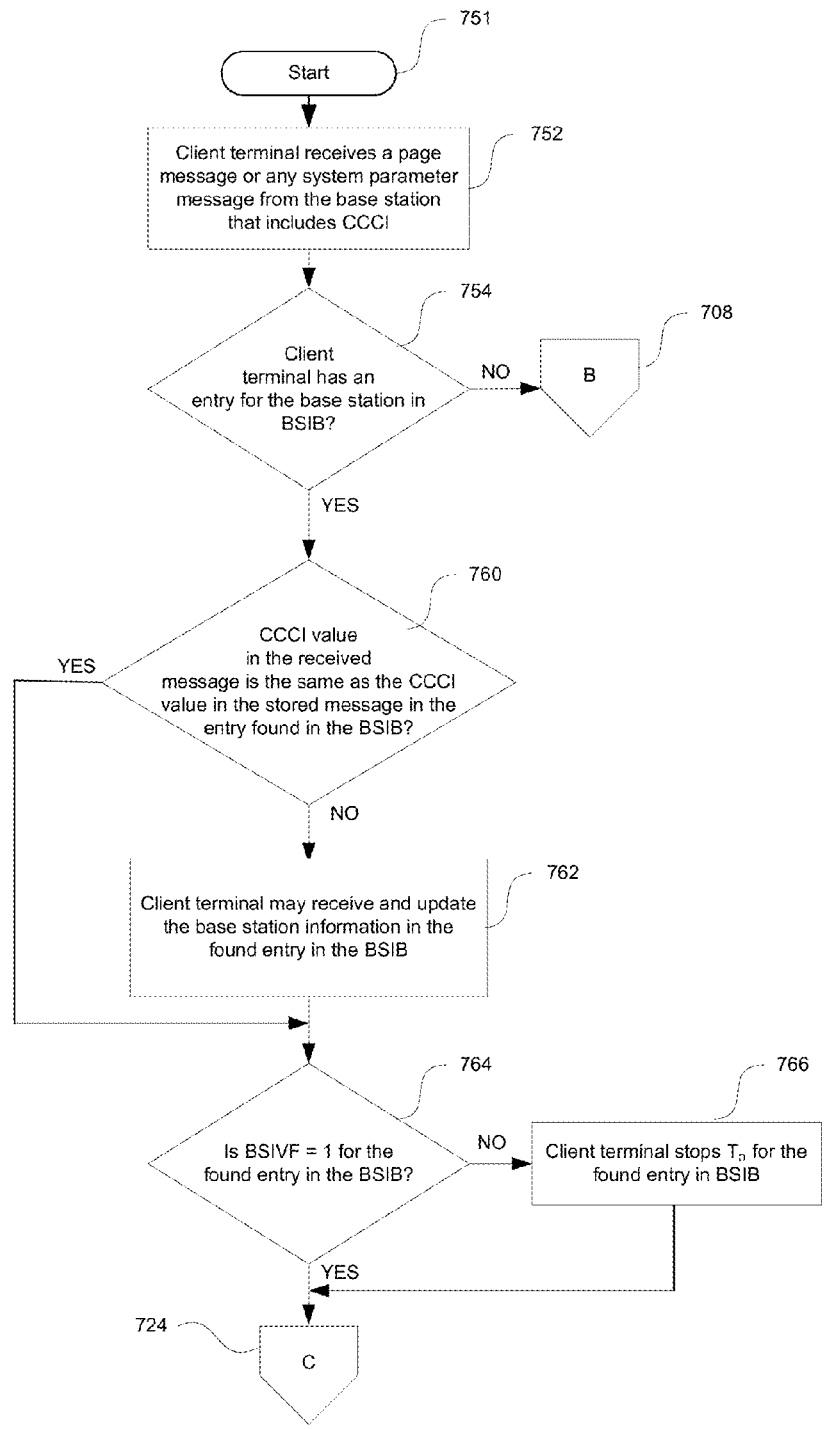

According to another aspect of the present invention, when a client terminal receives a base station broadcast system information which carries the CCCI(s) value(s) from a base station which has an entry in the BSIB with BSIVF set to 1 and timer Ta is running and if the CCCI(s) value(s) carried in the base station broadcast system information is the same as the CCCI(s) value(s) stored in the client terminal BSIB for that base station then the client terminal may restart timer Ta as per the algorithm illustrated in flow diagrams in FIG. 7D and FIG. 7C. Referring to FIG. 7D, the processing begins at stage 752 where a client terminal receives a page message or a system parameters message which include a CCCI parameter. At processing stage 754, the BSIB is searched for an entry with the BSID for which the page or system parameters is received. If not found, the processing jumps to the processing stage 708 in the FIG. 7A. The processing flow from the stage 708 onwards is already described earlier. Returning to processing stage 754, if an entry is found for the BSID for which the information is received, the processing advances to the stage 760. At processing stage 760, determination is made whether the CCCI value in the received message is the same as the CCCI value in the stored message in the BSIB. If the CCCIs are the same, the processing jumps to processing stage 764. At processing stage 764, the BSIVF of the found entry is checked. If the BSIVF of the found entry is equal to 1, the processing advances to the processing stage 724. The processing from stage 724 and onwards is already described earlier. Returning to the processing stage 764, if the BSIVF of the found entry is not equal to 1, i.e., BSIVF=2, the processing moves to the stage 766. At processing stage 766, the client terminal stops the timer Tp for the found entry and then the processing moves to the processing stage 724. Further processing from stage 724 is already described earlier. Returning to processing stage 760, if the CCCI value of the received message is not the same as the CCCI value of the found entry in the BSIB, the system information in the found entry is updated with the newly received page or systems parameters message. The processing then continues at processing stage 764. The further processing from stage 764 onwards is already described earlier.

There are three different starting points for the processing flow illustrated in FIGS. 7A, 7B, 7C and 7D. The relevant starting point depends on the type of system information received. If the system information is received for a new cell that needs to be added to the BSIB, the processing begins at the start stage 701. If the system information is received for a cell for which it is known that an entry exists in the BSIB, and the existing information needs to be updated, the processing begins at the start stage 725. If the system information containing a CCCI is received, the processing begins at the start stage 751. Regardless of where the processing flow is entered, it always terminates at processing stage 750.

According to another aspect of the present invention, when a client terminal does cell reselection or handover to a base station which already has an entry in the BSIB with BSIVF set to either 1 or 2, a client terminal may decode the base station broadcast system information which carries the CCCI(s) values(s) and may compare the received CCCI(s) values(s) with the CCCI(s) value(s) stored in the BSIB entry for that base station. If the CCCI(s) value(s) stored in the BSIB for that base station and the CCCI(s) value(s) received in the base station broadcast system information are the same, then a client terminal may not receive or may not process the received base station broadcast system information with the same CCCI(s) value(s), the client terminal may use the algorithm illustrated in the flow diagram in FIG. 7C to manage the new base station broadcast system information and the client terminal may use the stored base station broadcast system information to continue the communication with the base station.

Typically, in a wireless communication system some of the system information messages broadcast by a base station may be critical for the client terminal to get connected to the base station. According to another aspect of the present invention when a client terminal needs to connect to the base station immediately after the client terminal does cell reselection or handover, the client terminal may receive the base station broadcast system information which carries the CCCI(s) value(s) and compares the CCCI(s) value(s) stored in the BSIB and if the received and the stored CCCI(s) value(s) are the same then the client terminal may not receive the remaining base station broadcast system information and the client terminal may use the stored base station broadcast system information to get connected to the base station. It may reduce the time required by the client terminal to get connected to the base station and may reduce power consumption.

According to another aspect of the present invention, all aspects of the invention may be applied to storing, managing and using the multicast system information of N latest SBSs. The stored base station multicast system information in the client terminal memory is herein referred as Base Stations Multicast system information Base (BSMIB). The timers that manage the base station multicast system information entry in BSMIB are Tma and Tmp respectively. The value of Tma and Tmp may be determined by simulations, field data analysis, or combination of both. Once determined, a given value may be programmed to a register by the firmware in a controller/processor of the client terminal such as the MCU or SPU. The value of Tma and Tmp may be in the order of few hour(s) and it may vary for different network configurations in different wireless communication systems. It may vary for different application in a wireless communication system. For example, Tma and Tmp may be chosen to be 1 hour and 3 hours respectively.

According to another aspect of the present invention the number of serving base stations for which the base station broadcast system information is stored, managed and used may be different than the number of SBSs for which the base station multicast system information stored, managed and used.

According to another aspect of the present invention, all the aspects of the invention discussed in connection with FIGS. 7A, 7B and 7C may be applied to the set of M latest NBSs. The stored NBS broadcast system information in the client terminal memory is herein referred as Neighbor Base Stations Information Base (NBSIB). The timers that manage the neighbor base station entry in NBSIB are timer Tna and timer Tnp respectively. The value of timer Tna and timer Tnp may be determined by simulations, field data analysis, or combination of both. Once determined, a given value may be programmed to a register by the firmware in a controller/processor of the client terminal such as the MCU or SPU. The value of timer Tna and timer Tnp may be in the order of few hour(s) and it may vary for different network configurations in different wireless communication systems. For example, Tna and Tnp may be chosen to be 1 hour and 12 hours respectively.

According to another aspect of the present invention, if any of the SBS in the BSIB becomes a NBS, then the client terminal may use all or part of the serving base station broadcast system information for the purpose of the neighbor base station for the broadcast system information that has not changed. The use of already decoded system information maintained in the BSIB may reduce the power consumption by avoiding unnecessary system information decoding for neighbor cells.

According to another aspect of the present invention, if any of the NBSs in the NBSIB becomes a SBS, then the client terminal may use all or part of the neighbor base station broadcast system information for the purpose of the SBS for the broadcast system information that has not changed. The use of already decoded system information maintained in the NBSIB may reduce the power consumption by avoiding unnecessary system information decoding for the newly selected serving cell and may also reduce latency for service availability in the newly selected serving cell.

According to an aspect of the invention, the number of entries in the BSIB may not be constrained to fixed values such as N SBSs and M NBSs. According to an aspect of the invention, new entries may continue to be added in the BSIB as long as memory is available for storing the system information.

By way of example only, the above-described method may be implemented in a receiver, e.g., a user device such as a wireless mobile station (MS) 12 as shown in FIG. 1.

As shown in FIG. 7, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 8:
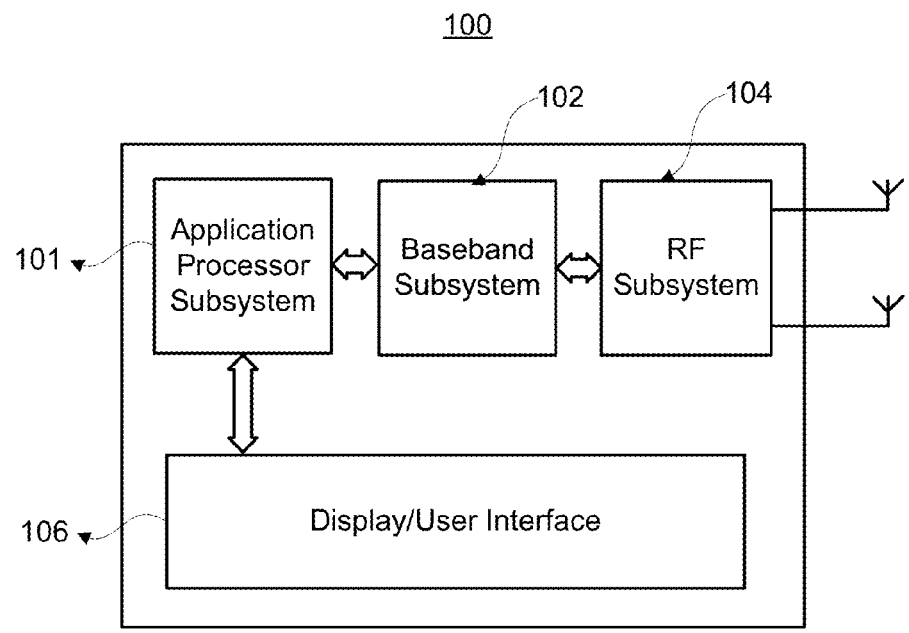
FIG. 8 illustrates a wireless mobile station diagram, which may be employed with aspects of the invention described herein.
Figure 9:
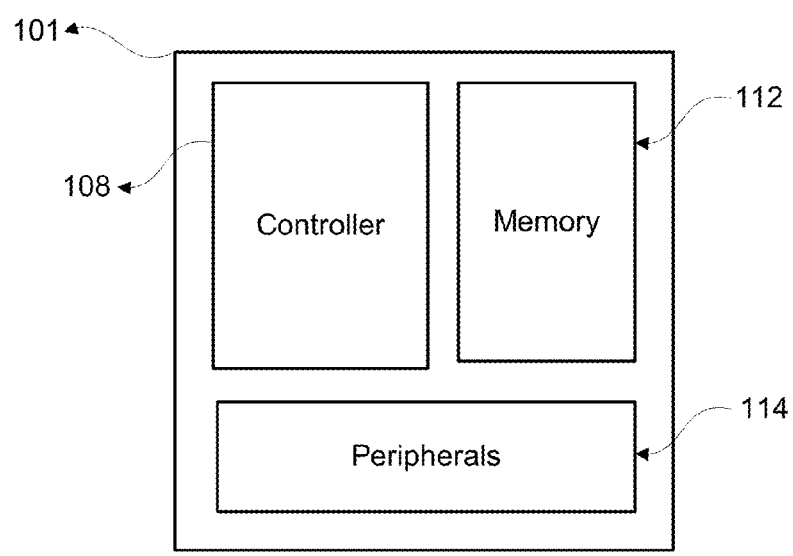
FIG. 9 illustrates an application processor subsystem for a wireless mobile station, which may be employed with aspects of the invention described herein.
Figure 10:
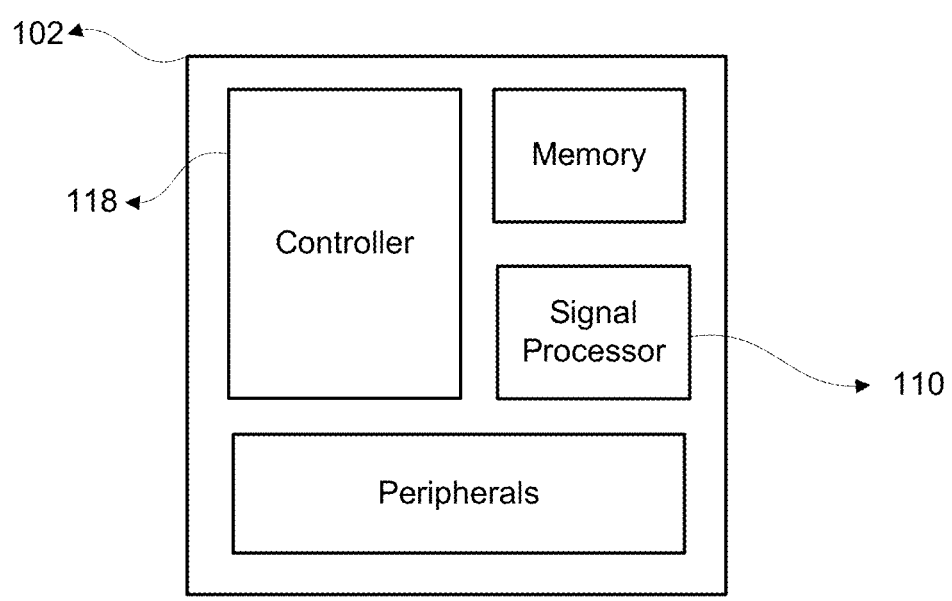
FIG. 10 illustrates a baseband subsystem for a wireless mobile station, which may be employed with aspects of the invention described herein.
Figure 11:
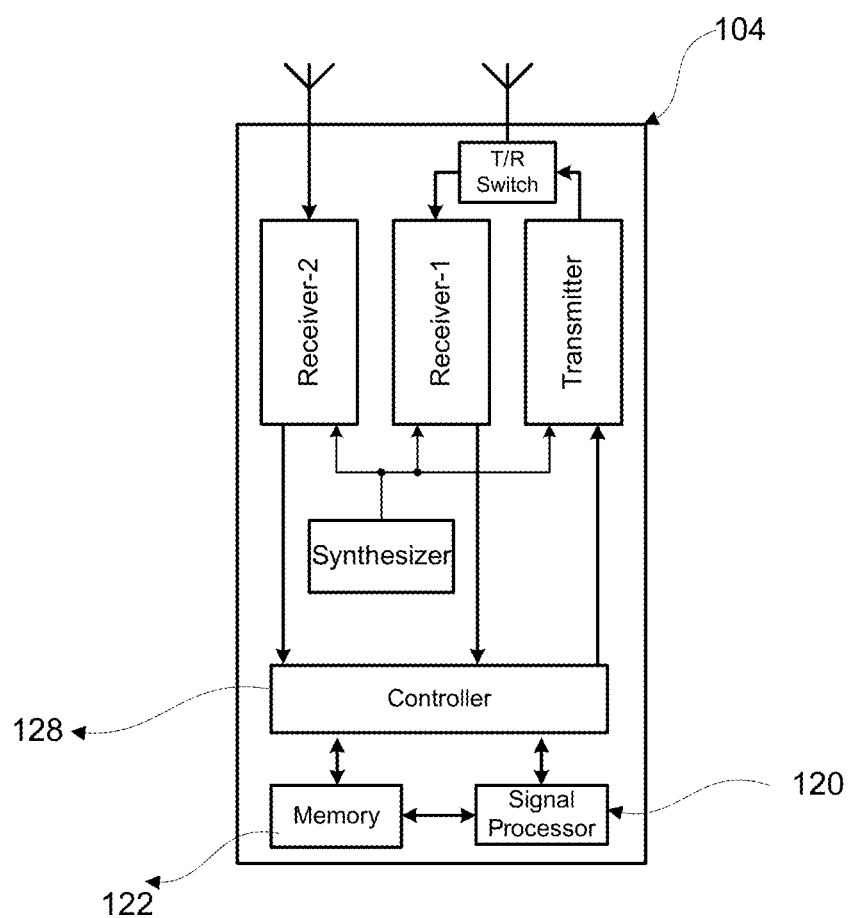
FIG. 11 illustrates an RF subsystem for a wireless mobile station, which may be employed with aspects of the invention described herein.

The application processor subsystem 101 as shown in FIG. 8 may include a controller 108 such as a microcontroller, another processor or other circuitry. The baseband subsystem 102 as shown in FIG. 9 may include a controller 118 such as a microcontroller or other processor. The RF subsystem 104 as shown in FIG. 10 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present invention.

Peripherals 114 such as a full or partial keyboard, video or still image display, audio interface, etc may be employed and managed through the controller 108.

Aspects of the present invention may be implemented in firmware of the controller 108 of the application processor and/or the controller 118 of the baseband subsystem. In another alternative, aspects of the present invention may also be implemented as a combination of firmware and hardware of the application processor subsystem 101 and/or the baseband subsystem 102. For instance, a signal processing entity of any or all of the FIG. 9 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the invention may include smartphones, tablets, laptops, gaming consoles, cameras, video camcorders, TV, car entertainment systems, etc.

For client terminals used in stationary or limited mobility applications, the number of cell reselections and handovers may be limited due to lack of mobility. The aspects of the present invention enable client terminals in such applications to avoid having to update the broadcast or multicast system information for long periods of time. Often such client terminals are battery operated without the ability to recharge the batteries such as in the case of Machine-2-Machine (M2M) or Internet of Things (IoT) devices. The aspects of the present invention may enable significant reduction in power consumption and may extend the life of the M2M/IoT client terminals.

Aspects of the present invention may be applied to all types of mobile communications systems and the like, such as systems based on 3rd Generation Partnership Project (3GPP) Long Term Evolution (LTE) of wireless communication standard, systems based on 3GPP Wideband Code Division Multiple Access ("WCDMA") standard, systems based on an IEEE 802.16 wireless communication standard, etc.

Although aspects of the invention herein have been described with reference to particular embodiments, it is to be understood that these embodiments are merely illustrative of the principles and applications of the aspects of the present invention. It is therefore to be understood that numerous modifications may be made to the illustrative embodiments and that other arrangements may be devised without departing from the spirit and scope of the aspects of the present invention as defined by the appended claims. Aspects of each embodiment may be employed in the other embodiments described herein.

The invention claimed is:

1. A method for searching system information in a communication signal received at a client terminal from a given base station in a wireless communication network, the method comprising:
   controlling, by a processing device of the client terminal, the searching the system information in the communication signal, and
   when a determination from the searching is new base station system information is included in the system information, controlling, by the processing device, steps of:
   (I) determining whether or not an entry exists in a base stations information base (BSIB) stored in a memory at the client terminal for a Base Station Identity (BSID) of a base station for which the new base station system information is received,
      (A) when the entry in the BSIB is determined to exist for the BSID of the base station for which the new base station system information is received, determining whether or not a Base Station Information Validity Flag (BSIVF) of the entry for the BSID of the base station is equal to a first value, and
         updating the entry for the BSID of the base station in the BSIB with the new base station system information, when the BSIVF of the entry for the BSID of the base station is determined to be equal to the first value, and
         updating the entry for the BSID of the base station in the BSIB with the new base station system information and stopping a started Passive Base Station Information Validity Timer (PBSIVT) of the entry for the BSID of the base station, in which the PBSIVT has a timer value Tp, when the BSIVF of the entry for the BSID of the base station is determined not to be equal to the first value,
      (B) when the entry in the BSIB is determined not to exist for the BSID of the base station for which the new base station system information is received,
         (i) determining whether or not a second entry exists in the BSIB having a BSIVF thereof equal to a second value, and
         when the second entry having the BSIVF thereof equal to the second value is determined to exist in the B SIB, adding the new base station system information to the second entry, and
         when the second entry having the BSIVF thereof equal to the second value is determined not to exist in the BSIB, determining whether or not at least one third entry exists in the BSIB having a BSIVF thereof equal to a third value, and
         when the at least one third entry having the BSIVF thereof equal to the third value is determined to exist, stopping a started PBSIVT of the at least one third entry having a lowest timer value Tp and replacing base station information of the at least one third entry having the lowest timer value Tp with the new base station system information, and
         when the at least one third entry having the BSIVF thereof equal to the third value is determined not to exist, for a fourth entry in the BSIB having a BSIVF thereof equal to the first value and an Active Base Station Information Validity Timer (ABSIVT), in which the ABSIVT has a timer value Ta, with a lowest timer value Ta, stopping the ABSIVT which was started and replacing base station information for the fourth entry with the new base station system information;
   (II) starting or restarting an ABSIVT of a fifth entry, in which the fifth entry is (i) when one entry of the entry, the second entry and the at least one third entry is determined to exist, the one entry, and (ii) when the entry, the second entry and the at least one third entry are determined not to exist, the fourth entry,
      setting a BSIVF of the fifth entry equal to the first value,
      when an ABSIVT of the fifth entry is determined to expire based on monitoring of a timer value Ta thereof,
         setting the BSIVF of the fifth entry equal to the third value, and
         starting a PBSIVT for the fifth entry, and
            when the PBSIVT for the fifth entry is determined to expire based on monitoring of a timer value Tp thereof, setting the BSIVF of the fifth entry equal to the second value; and
   (III) using, at the client terminal, the BSIB for connection to or communication with a new base station.

2. The method of claim 1,
wherein base station system information for N base stations which are most recent Serving Base Stations (SBS) is stored in the BSIB.

3. The method of claim 2,
wherein all available latest base station system information received from the N base stations which are most recent SBS and associated Configuration Change Count Indicator (CCCI) values are stored in the BSIB.

4. The method of claim 1,
wherein each entry in the BSIB has an ABSIVT and an PBSIVT.

5. The method of claim 1,
wherein each entry in the BSIB has BSIVF.

6. The method claim 1,
wherein, when the client terminal is powered on, a BSIVF of each entry in the BSIB is set to the second value.

7. The method of claim 1,
wherein the BSID is a Physical Cell Identity (PCI) or a Global Cell Identity (GCI).

8. The method of claim 7,
wherein the PCI is obtained by decoding a physical layer signal, and the GCI is obtained by decoding a system information message.

9. The method of claim 1,
wherein, when the client terminal in the network has a non-volatile storage, a current state of the BSIB is stored in the non-volatile memory, and
the method further comprising controlling, by the processing device, when the client terminal is powered off and then powered on again, selecting one base station using the current state of the BSIB stored in the non-volatile storage and updating the BSIB only when an update is required based on status of BSIVF.

10. The method of claim 1,
wherein a current state of the BSIB is stored in a memory of the client terminal in the network whose contents is not lost when the client terminal is operating in an airplane mode, and
the method further comprising controlling, by the processing device,
when the client terminal switches to normal mode from the airplane mode, selecting one base station using the current state of the BSIB stored in the memory and updating the BSIB only when an update is required based on status of BSIVF, and
when the client terminal is unable to select the one base station using the current state of the BSIB stored in the memory, setting a BSIVF of each of N entries of the BSIB equal to the second value.

11. The method of claim 1, further comprising:
controlling, by the processing device, when the entry is determined to exist for the BSID of the base station and have a BSIVF thereof equal to the first value and an ABSIVT of the entry for the BSID of the base station is determined to be running, updating the entry for the BSID of the base station in the BSIB with the new base station system information and restarting the ABSIVT of the entry.

12. The method of claim 1, wherein the second entry having the BSIVF thereof equal to the second value is determined to exist in the BSIB, when a client terminal in the network camps onto any new base station, performs base station reselection or hands over to a new base station.

13. The method of claim 1, further comprising:
controlling, by the processing device, when the at least one third entry having the BSIVF thereof equal to the third value is determined to exist, starting an ABSVIT of the fifth entry.

14. The method of claim 1, further comprising:
controlling, by the processing device, when the entry in the BSIB is determined to exist for the BSID of the base station and a page message or a system parameter message which includes a Configuration Change Count Indicator (CCCI) is determined to be received for the BSID of the base station,
determining whether or not a value of the CCCI of the page message or the system parameter message received is same as a value of a CCCI in a message stored in the entry, and when the value of the CCCI of the page message or the system parameter message received is determined not to be the same as the value of CCCI in the message stored in the entry, updating system information in the entry with parameters of the page message or system parameter message received, and
determining whether or not the entry has the BSIVF thereof equal to the first value, and when the entry is determined not to have the BSIVF thereof equal to the first value, stopping a started PBSIVT of a sixth entry.

15. The method of claim 1, further comprising:
controlling, by the processing device, when
the client terminal is performing base station reselection or hand over to the base station for which the new base station system information is received,
a sixth entry is determined to exist in the BSIB for the BSID of the base station having a BSIVF thereof equal to the first value or the third value,
the new base station system information carries a Configuration Change Count Indicator (CCCI) value, and
a CCCI value for the second entry or the at least one third entry is same as the CCCI value of the new base station system information,
without performing step (I) and step (II),
starting or restarting an ABSIVT of the sixth entry,
setting the BSIVF of the sixth entry equal to the first value, and
when the ABSIVT of the sixth entry is determined to expire based on monitoring of a timer value Ta thereof,
setting the BSIVF of the sixth entry equal to the third value, and
starting a PBSIVT for the sixth entry, and when the PBSIVT for the sixth entry is determined to expire based on monitoring of a timer value Tp thereof, setting the BSIVF of the sixth entry equal to the second value.

16. The method of claim 1, further comprising:
controlling, by the processing device, when
the client terminal is to connect to the base station immediately after the client terminal performs base station reselection or handover,
the new base station system information carries a Configuration Change Count Indicator (CCCI) value, and
a CCCI value in the BSIB is same as the CCCI value of the new base station system information,
connecting to the base station using system information stored in the BSIB without using the new base station system information.

17. The method of claim 1,
wherein at least one of broadcast base station system information or multicast system information is stored in the BSIB, and
wherein the new base station system information includes at least one of new base station broadcast system information or new base station multicast system information.

18. The method of claim 17,
wherein base station system information for N base stations which are most recent Serving Base Stations (SBS) is stored in the BSIB, and wherein the base station system information includes base station multicast system information for the N base stations which are most recent SBS.

19. The method of claim 17, wherein timer values Ta and Tp for respective ABSIVT and PBSIVT of each entry in the BSIB having the base station system information are determined by at least one of a simulation or field data analysis.

20. The method of claim 17, wherein a number of Serving Base Stations (SBS) for which the broadcast base station system information is stored in the BSIB is different than a number of SBS for which the multicast system information is stored in the BSIB.

21. The method of claim 18, wherein base station system information for M base stations which are latest Neighboring Base Stations (NBS) is stored with the base station system information for the N base stations which are most recent SBS in the BSIB.

22. The method of claim 21, wherein when any given SBS in the BSIB becomes a new NBS, base station system information for the given SBS becomes base station information for the new NBS for unchanged base station system information.

23. The method of claim 21, wherein when any given NBS in the BSIB becomes a new SBS, base station system information for the given NBS becomes base station information for the new SBS for unchanged base station system information.

24. An apparatus for searching system information in a communication signal received at a client terminal from a given base station in a wireless communication network, the apparatus comprising:
- a processing device; and
- a memory including instructions which, when executed by the processing device, control the searching the system information in the communication signal, and
- when a determination from the searching is new base station system information is included in the system information, the instructions, when executed by the processing device, control operations of:
  (I) determining whether or not an entry exists in a base stations information base (BSIB) stored in the memory for a Base Station Identity (BSID) of a base station for which the new base station system information is received,
    (A) when the entry in the BSIB is determined to exist for the BSID of the base station for which the new base station system information is received, determining whether or not a Base Station Information Validity Flag (BSIVF) of the entry for the BSID of the base station is equal to a first value, and
      updating the entry for the BSID of the base station in the BSIB with the new base station system information, when the BSIVF of the entry for the BSID of the base station is determined to be equal to the first value, and
      updating the entry for the BSID of the base station in the BSIB with the new base station system information and stopping a started Passive Base Station Information Validity Timer (PBSIVT) of the entry for the BSID of the base station, in which the PBSIVT has a timer value Tp, when the BSIVF of the entry for the BSID of the base station is determined not to be equal to the first value,
    (B) when the entry in the BSIB is determined not to exist for the BSID of the base station for which the new base station system information is received,
      (i) determining whether or not a second entry exists in the BSIB having a BSIVF thereof equal to a second value, and
        when the second entry having the BSIVF thereof equal to the second value is determined to exist in the B SIB, adding the new base station system information to the second entry, and
        when the second entry having the BSIVF thereof equal to the second value is determined not to exist in the BSIB, determining whether or not at least one third entry exists in the BSIB having a BSIVF thereof equal to a third value, and
          when the at least one third entry having the BSIVF thereof equal to the third value is determined to exist, stopping a started PBSIVT of the at least one third entry having a lowest timer value Tp and replacing base station information of the at least one third entry having the lowest timer value Tp with the new base station system information, and
          when the at least one third entry having the BSIVF thereof equal to the third value is determined not to exist, for a fourth entry in the BSIB having a BSIVF thereof equal to the first value and an Active Base Station Information Validity Timer (ABSIVT), in which the ABSIVT has a timer value Ta, with a lowest timer value Ta, stopping the ABSIVT which was started and replacing base station information for the fourth entry with the new base station system information;
  (II) starting or restarting an ABSIVT of a fifth entry, in which the fifth entry is (i) when one entry of the entry, the second entry and the at least one third entry is determined to exist, the one entry, and (ii) when the entry, the second entry and the at least one third entry are determined not to exist, the fourth entry,
    setting a BSIVF of the fifth entry equal to the first value,
    when an ABSIVT of the fifth entry is determined to expire based on monitoring of a timer value Ta thereof,
      setting the BSIVF of the fifth entry equal to the third value, and
      starting a PBSIVT for the fifth entry, and
        when the PBSIVT for the fifth entry is determined to expire based on monitoring of a timer value Tp thereof, setting the BSIVF of the fifth entry equal to the second value; and
  (III) using, at the client terminal, the BSIB for connection to or communication with a new base station.

25. A wireless communication device comprising:
- a receiver to receive new base station system information in a wireless communication network; and
- a processing device to search system information in a communication signal received at the wireless communication device from a given base station in the wireless communication network, and
- when a determination from the searching is new base station system information is included in the system information, the processing device is to control operations of:
  (I) determining whether or not an entry exists in a base stations information base (BSIB) stored in a memory at the wireless communication device for a Base Station Identity (BSID) of a base station for which the new base station system information is received,
(A) when the entry in the BSIB is determined to exist for the BSID of the base station for which the new base station system information is received, determining whether or not a Base Station Information Validity Flag (BSIVF) of the entry for the BSID of the base station is equal to a first value, and
updating the entry for the BSID of the base station in the BSIB with the new base station system information, when the BSIVF of the entry for the BSID of the base station is determined to be equal to the first value, and
updating the entry for the BSID of the base station in the BSIB with the new base station system information and stopping a started Passive Base Station Information Validity Timer (PBSIVT) of the entry for the BSID of the base station, in which the PBSIVT has a timer value Tp, when the BSIVF of the entry for the BSID of the base station is determined not to be equal to the first value,
(B) when the entry in the BSIB is determined not to exist for the BSID of the base station for which the new base station system information is received,
(i) determining whether or not a second entry exists in the BSIB having a BSIVF thereof equal to a second value, and
when the second entry having the BSIVF thereof equal to the second value is determined to exist in the B SIB, adding the new base station system information to the second entry, and
when the second entry having the BSIVF thereof equal to the second value is determined not to exist in the BSIB, determining whether or not at least one third entry exists in the BSIB having a BSIVF thereof equal to a third value, and
when the at least one third entry having the BSIVF thereof equal to the third value is determined to exist, stopping a started PBSIVT of the at least one third entry having a lowest timer value Tp and replacing base station information of the at least one third entry having the lowest timer value Tp with the new base station system information, and
when the at least one third entry having the BSIVF thereof equal to the third value is determined not to exist, for a fourth entry in the BSIB having a BSIVF thereof equal to the first value and an Active Base Station Information Validity Timer (ABSIVT), in which the ABSIVT has a timer value Ta, with a lowest timer value Ta, stopping the ABSIVT which was started and replacing base station information for the fourth entry with the new base station system information;
(II) starting or restarting an ABSIVT of a fifth entry, in which the fifth entry is (i) when one entry of the entry, the second entry and the at least one third entry is determined to exist, the one entry, and (ii) when the entry, the second entry and the at least one third entry are determined not to exist, the fourth entry,
setting a BSIVF of the fifth entry equal to the first value,
when an ABSIVT of the fifth entry is determined to expire based on monitoring of a timer value Ta thereof,
setting the BSIVF of the fifth entry equal to the third value, and
starting a PBSIVT for the fifth entry, and
when the PBSIVT for the fifth entry is determined to expire based on monitoring of a timer value Tp thereof, setting the BSIVF of the fifth entry equal to the second value; and
(III) using the BSIB for connection to or communication with a new base station.

* * * * *